(12) United States Patent
Zhang et al.

(10) Patent No.: US 9,349,189 B2
(45) Date of Patent: May 24, 2016

(54) OCCLUSION RESISTANT IMAGE TEMPLATE MATCHING USING DISTANCE TRANSFORM

(71) Applicant: HERE Global B.V., Veldhoven (NL)

(72) Inventors: Xi Zhang, Chicago, IL (US); Xin Chen, Evanston, IL (US)

(73) Assignee: HERE Global B.V., Veldhoven (NL)

(*) Notice: Subject to any disclaimer, the term of this patent is extended or adjusted under 35 U.S.C. 154(b) by 5 days.

(21) Appl. No.: 14/319,814

(22) Filed: Jun. 30, 2014

(65) Prior Publication Data

US 2015/0003741 A1 Jan. 1, 2015

Related U.S. Application Data

(60) Provisional application No. 61/841,627, filed on Jul. 1, 2013.

(51) Int. Cl.
*G06K 9/62* (2006.01)
*G06T 7/00* (2006.01)
*G06K 9/00* (2006.01)
*G06K 9/03* (2006.01)

(52) U.S. Cl.
CPC .......... *G06T 7/0085* (2013.01); *G06K 9/00389* (2013.01); *G06K 9/00637* (2013.01); *G06K 9/03* (2013.01); *G06K 9/6203* (2013.01); *G06T 7/0028* (2013.01)

(58) Field of Classification Search
CPC ............................ G06T 7/0085; G06T 7/0028; G06K 9/00389; G06K 9/03; G06K 9/00637; G06K 9/6203
USPC ................................. 382/113, 199, 209, 218
See application file for complete search history.

(56) References Cited

U.S. PATENT DOCUMENTS

| 4,906,940 | A | * | 3/1990 | Greene | G06K 9/00798 382/100 |
|---|---|---|---|---|---|
| 8,311,285 | B2 | * | 11/2012 | Ramalingam | G01C 21/3602 382/104 |
| 2003/0223615 | A1 | * | 12/2003 | Keaton | G06K 9/0063 382/100 |
| 2009/0252373 | A1 | * | 10/2009 | Paglieroni | G06K 9/00637 382/103 |
| 2010/0194679 | A1 | * | 8/2010 | Wu | G06K 9/00375 345/156 |
| 2010/0329508 | A1 | * | 12/2010 | Chen | G06K 9/00697 382/103 |
| 2012/0155745 | A1 | * | 6/2012 | Park | G06K 9/00637 382/154 |
| 2012/0170804 | A1 | * | 7/2012 | Lin | G06T 7/204 382/103 |

(Continued)

OTHER PUBLICATIONS

Daniel Mohr et al., Continuous Edge Gradient-Based Template Matching for Articulated Objects, IfI Technical Report Series, Department of Informatics, Clausthal University of Technology, International Conference on Computer Vision Theory and Applications (VISAPP), Feb. 5, 2009.*

(Continued)

*Primary Examiner* — John Strege
(74) *Attorney, Agent, or Firm* — Lempia Summerfield Katz LLC

(57) ABSTRACT

A computing device performs matching between a target image and one or more template images. The computing device receives image data and performs an edge detection algorithm on the image data. The edge detection algorithm includes a distance metric based on angles between gradient vectors in the image data and gradient vectors in one or more templates. The computing device matches a building model to the image data based on results of the edge detection algorithm, wherein the building model is associated with the one or more templates.

20 Claims, 8 Drawing Sheets

(56) References Cited

U.S. PATENT DOCUMENTS

| | | | | |
|---|---|---|---|---|
| 2013/0096884 A1* | 4/2013 | Parker | ............... | G06T 7/0083 702/189 |
| 2014/0340489 A1* | 11/2014 | Medioni | ............... | G06K 9/46 348/50 |

OTHER PUBLICATIONS

Li et al., Real-time template matching based on gradient direction vector product, IEEE, 2011.*

Barrow et al., Parametric Correspondence and Chamfer Matching: Two New Techniques for Image Matching, 1977, pp. 659-663, Proceedings of the 5th International Joint Conference on Artificial Intelligence.

Belongie et al., Shape Matching and Object Recognition Using Shape Contexts, Apr. 2002, pp. 509-522, Vo. 2, No. 24, IEEE Transactions on Pattern Analysis and Machine Intelligence.

Berg et al., Shape Matching and Object Recognition Using Low Distortion Correspondences, 2005, pp. 26-33, Proceedings of the 2005 IEEE Computer Society Conference on Computer Vision and Pattern Recognition.

Borgefors, Distance Transformations in Digital Images, 1986, pp. 344-371, Computer Vision, Graphics, and Image Processing.

Borgefors, Hierarchical Chamfer Matching: A Parametric Edge Matching Algorithm, Nov. 1988, pp. 849-865, vol. 10, No. 6, IEEE Transactions on Pattern Analysis and Machine Intelligence.

Danielsson, Euclidean Distance Mapping, 1980, pp. 227-248, Computer Graphics and Image Processing.

Felzenszwalb et al., Distance Transforms of Sampled Functions, Technical Report, 2004, Cornell Computing and Information Science.

Gavrila et al., Real-Time Object Detection for "Smart" Vehicles, 1999, pp. 87-93, Proceedings of the Seventh IEEE International Conference on Computer Vision.

Gavrila, Multi-Feature Hierarchical Template Matching Using Distance Transforms, 1998, pp. 439-444, Proceedings of Fourteenth International Conference on Pattern Recognition.

Goshtasby, 2-D and 3-D Image Registration, 2005, Wiley Interscience.

Hoffman et al., Salience of Visual Parts, 1997, pp. 29-78, vol. 63, Cognition.

Liu et al., Fast Directional Chamfer Matching, Jul. 2010, pp. 1696-1703, Proceedings of the 2010 IEEE Computer Society Conference on Computer Vision and Pattern Recognition.

Montanari, A Method for Obtaining Skeletons Using a Quasi-Euclidean Distance, Oct. 1968, pp. 600-624, vol. 15, No. 4, Journal of the Association for Computing Machinery.

Rosenfeld et al., Sequential Operations in Digital Picture Processing, Oct. 1966, pp. 471-494, vol. 13, No. 4, Journal of the ACM.

Rucklidge, Efficiently Locating Objects Using the Hausdorff Distance, Aug. 1996, International Journal of Computer Vision.

Shotton et al., Multi-Scale Categorical Object Recognition Using Contour Fragments, 2008, IEEE Transactions of Pattern Analysis and Machine Intelligence.

Thayananthan et al., Shape Context and Chamfer Matching in Cluttered Scenes, 2003, pp. 127-133, Proceedings of the 2003 IEEE Computer Society Conference on Computer Vision and Pattern Recognition.

You et al., Hierarchical Image Matching: A Chamfer Matching Algorithm Using Interesting Points, 1995, pp. 70-75, Proceedings of the Third Australian and New Zealand Conference on Intelligent Information Systems.

Zhang et al., A Learning-Based Approach for Automated Quality Assessment of Computer-Rendered Images, 2012, pp. 68-75, Proceedings of SPIE 8293, Image Quality and System Performance IX.

Zhang et al., Efficient Edge Matching in Cluttered Scenes, 2009, pp. 1645-1648, IEEE International Symposium on Circuits and Systems.

* cited by examiner (a)

(b)

(c)

(d)

OCCLUSION RESISTANT IMAGE TEMPLATE MATCHING USING DISTANCE TRANSFORM

CROSS-REFERENCE TO RELATED APPLICATIONS

This patent is related to and claims priority benefit of U.S. Provisional Application Ser. No. 61/841,627, filed Jul. 1, 2013, which is hereby incorporated by reference in its entirety.

FIELD

The following disclosure relates to image template matching, or more particularly, to a distance transform that provide accurate image template matching even when significant occlusion are present in the image data.

BACKGROUND

Shape matching or object recognition is a fundamental problem in computer vision and has been used in various applications ranging from information retrieval to object tracking. The measurements of similarities between templates and target objects have been studied extensively. Human beings naturally recognize thousands if not millions of shapes instantly with no effort. The lightening, scale, orientation, or viewing direction in which an object is viewed is easily reconciled by the human mind. Computers, on the other hand, do not easily interpret shapes when appearances have been modified. Computer vision focuses on the identification of these shapes.

One area of particular interest in computer vision is occlusions. An occlusion is a partially obstructed object in the image. Because a portion of the object is not viewable in the image, the object shape and other properties have changes. Occlusions occur when one object is positioned in front of another. Occlusions may also occur when lighting for an object changes. For example, shadows may change the appearance of an object. An image of an object taken midday may be matched easily to a template but images of the same object taken later in the day may be too occluded by shadows for accurate matching. One particular area of concern is object recognition in aerial photographs of buildings, which tend to cast far reaching shadows.

SUMMARY

A computing device performs matching between a target image and one or more template images. The computing device receives image data and performs an edge detection algorithm on the image data. The edge detection algorithm includes a distance metric based on angles between gradient vectors in the image data and gradient vectors in one or more templates. The computing device matches a building model to the image data based on results of the edge detection algorithm, wherein the building model is associated with the one or more templates.

BRIEF DESCRIPTION OF THE DRAWINGS

Exemplary embodiments of the present invention are described herein with reference to the following drawings.

FIG. 3 illustrates an example of a distance metric with edge orientation.

DETAILED DESCRIPTION

Sketch and silhouette are primary visual cues that have been shown to be a dominant element in human perception and cognition. Matching objects through sketch and silhouette discards other valuable visual information such as intensity and texture. On the other hand, shape provides a compact form representation of the information which has been shown to be very useful for matching. Techniques for matching objects using sketch edges may include a metric based on the distance measurement between corresponding pixels is adopted to evaluate the similarity among edge images.

Depending on whether the correspondence is built by matching pixels or features, matching methods can be categorized into two groups: feature-dependent and feature-independent. The feature-dependent group solves the correspondence problem by minimizing distance of feature between corresponding pixels. The feature-independent group determines the distance in a more general way over all of pixels. Usually, feature-independent based methods are preferred, when speed is significantly considered, however, the performance of such methods may be affected when the scene comes more complicated and possesses more noise. Conversely, by defining high dimensional spatial features, feature dependent methods perform better and are more resistant to cluttered and occluded scenes. This increased accuracy results in increased computation cost. Chamfer matching methods, which are based on integrating edge orientation, are a preferred choice when speed and accuracy are concerned. However, these methods do not support partial matching and may suffer from large error when an object is occluded.

A chamfer matching algorithm includes a distance transform for quantifying the differences between two different images. The differences may be distances between edge points in the images. The following embodiments include a distance metric that facilitates template matching even with occlusions and a noisy environment.

Figure 1:
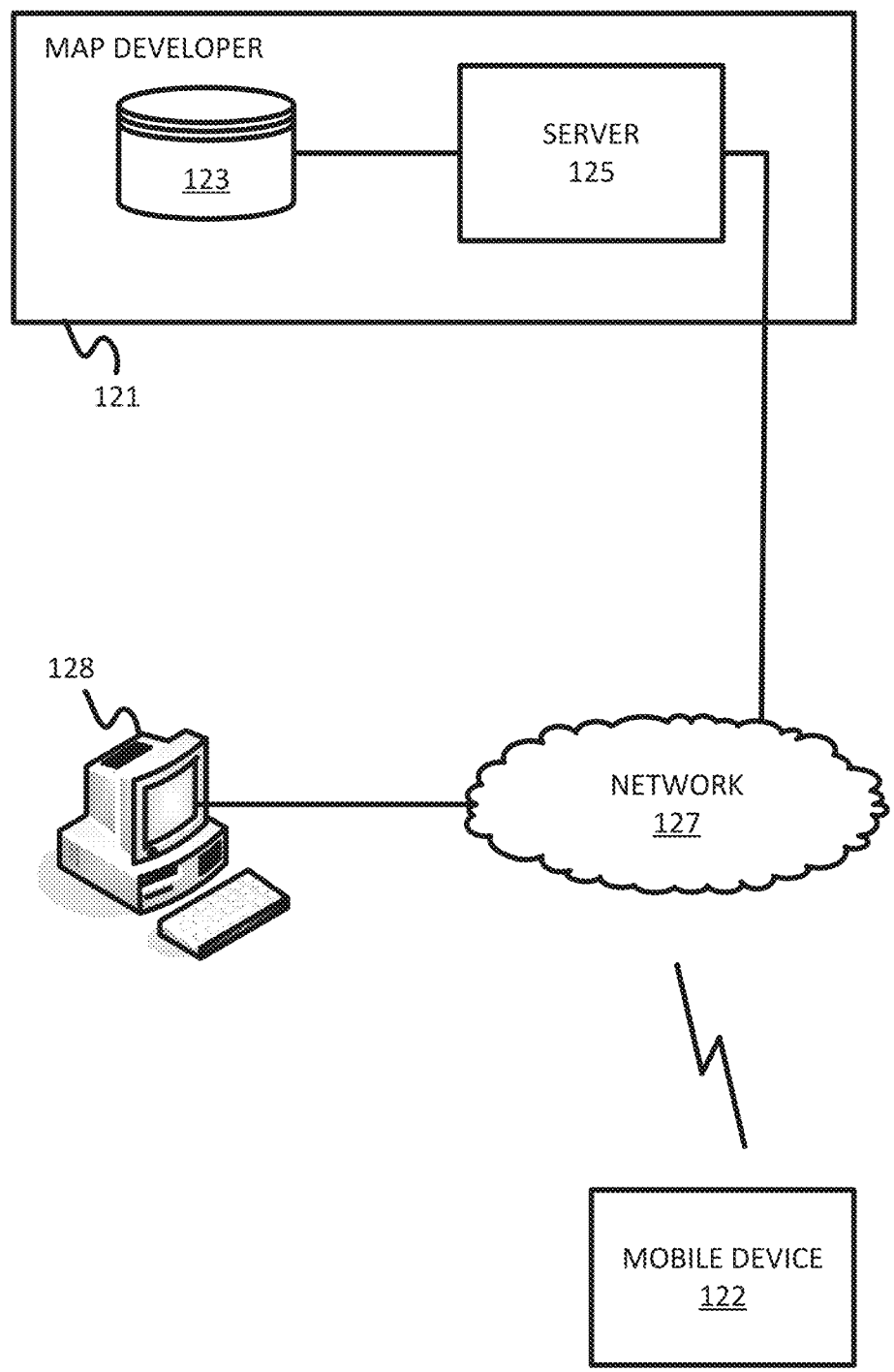

FIG. 1 illustrates an example system 120 for template matching. The system 120 includes a developer system 121, a mobile device 122, a workstation 128, and a network 127. Additional, different, or fewer components may be provided. For example, many mobile devices 122 and/or workstations 128 connect with the network 127. The developer system 121 includes a server 125 and a database 123. The server 125 includes at least a processor, a communication interface, and a memory. Either or both of the mobile device 122 and the server 125 are configured to perform the methods described herein.

The mobile device 122 and the server 125 are configured to perform template matching to register or align image data with a building model. The image data may be collected by a satellite or another aerial vehicle (e.g., airplane, helicopter, low-altitude radio controlled device such as a quad-copter, or an unmanned aerial vehicle).

The mobile device 122 and the server 125 are configured to receive and analyze the image data. The analysis may include an edge detection algorithm with a distance transform (distance metric). The distance transform is calculated from a gradient area of the neighborhood of each pixel. The distance transform describes each pixel as a function of neighboring pixels. The edge detection algorithm may include a window that slides across the image data. The size of the window may be configured by a user.

The mobile device 122 and the server 125 are configured to analyze the image data to identify occluded areas based on the distance transform. The occluded areas may include structures in shadows (partially or completely) of other structures, shadows from trees, or shadows from clouds. Potentially occluded areas are distinguished from normal areas in the image data. The mobile device 122 and the server 125 are configured to perform a first edge detection algorithm on the occluded areas and a second edge detection algorithm on the normal areas.

The database 123 may store the building footprints and the image data. The database 123 may associate building footprints with geographic locations and/or locations in the image data for registering the image data with the building footprints.

The mobile device 122 is a smart phone, a mobile phone, a personal digital assistant ("PDA"), a tablet computer, a notebook computer, a personal navigation device ("PND"), a portable navigation device, in-car navigation system, and/or any other known or later developed portable or mobile device. The mobile device 122 includes one or more detectors or sensors as a positioning system built or embedded into or within the interior of the mobile device or vehicle 122. The mobile device 122 receives location data from the positioning system.

The developer system 121, the workstation 128, and the mobile device 122 are coupled with the network 127. The phrase "coupled with" is defined to mean directly connected to or indirectly connected through one or more intermediate components. Such intermediate components may include hardware and/or software-based components.

Figure 2:
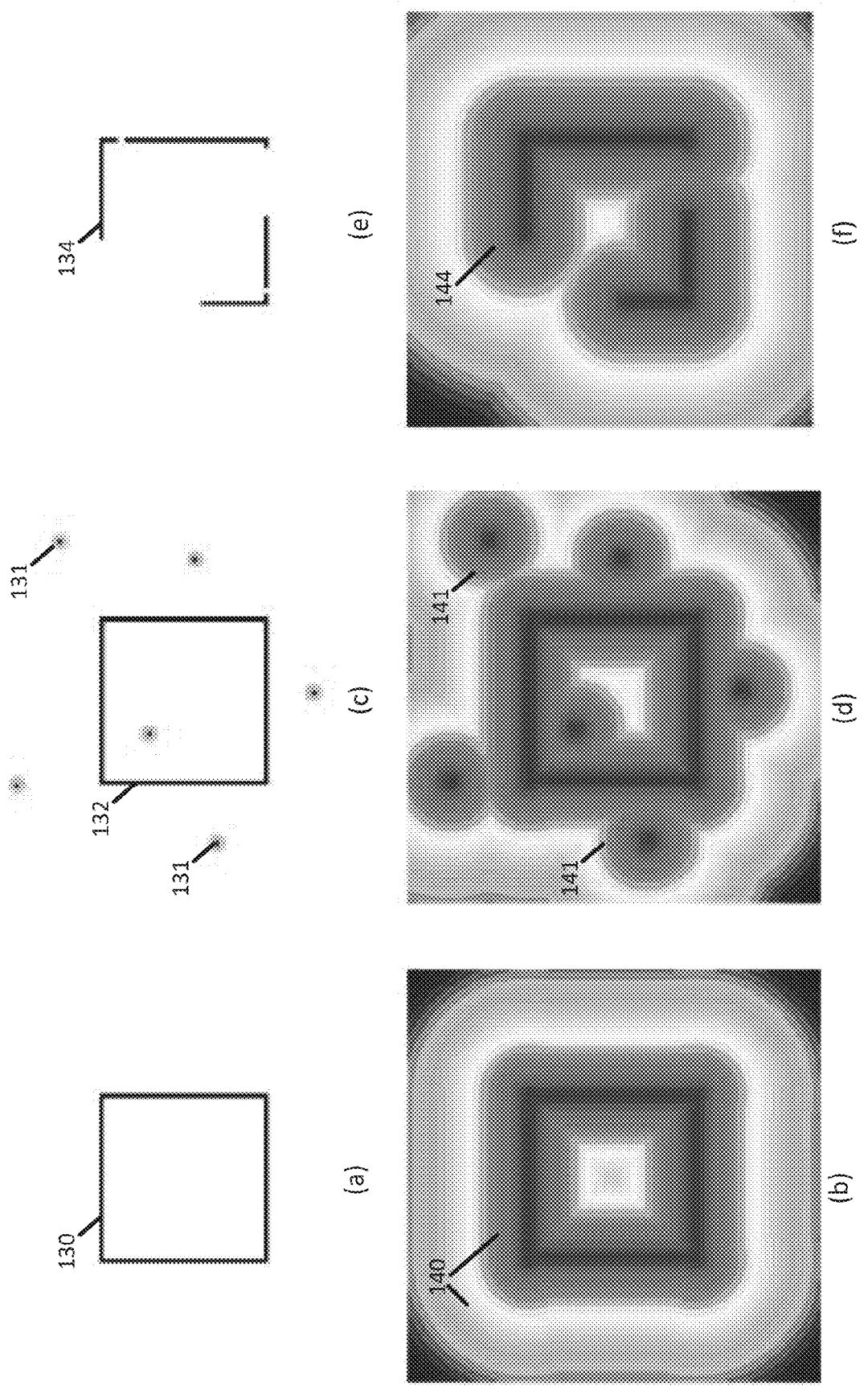
FIG. 2 illustrates examples distance transforms for chamfer matching.

FIG. 2 illustrates examples distance transforms for chamfer matching. In chamfer matching, one image is a target image and the other image is a template. The target image and the template image may be binary images in which each pixel may have only two values (e.g., 1 or 0). The target image may be an image observed in the real world (e.g., an aerial image or other photograph), and the template may be one of multiple templates that may be potential matched with the target image.

In one example, the templates include building models. The building model may be a three-dimensional building model or a two-dimensional building model. The two-dimensional building model may be referred to as building footprints. The building model may be measured using a range finding device (e.g., a light detection and ranging (LIDAR) sensor) mounted on a ground vehicle or an aerial vehicle. The building mode may be created through measuring the locations of buildings manually. In the three-dimensional example, the building model may include outlines of buildings derived from a point cloud collected by the range finding device. In the two-dimensional example, the building model may include locations of the corners and/or edges of the buildings. The building model may be overlaid on a city map and stored in a map database.

The target image (U) may be formed by pixels $u_i$ such that $U=\{u_i\}$ and the template image (V) may be formed by pixels $v_i$ such that $V=\{v_i\}$. The transformation (W) between the template image and the target image is Euclidian. Thus, the transformation (W) includes one or more of a rotation (R), and a translation (T). The translation may be performed by a translation vector include a translation distance in one or more directions. The rotation may be performed by a rotation matrix including an angle of rotation in one or more directions. The position of any pixel $v_i$ after the transformation including translation (T) and rotation (R) may be given by Equation 1.

$$W(v_i; [R|T]) = R \cdot v_i + T \equiv v'_i \qquad \text{Eq. 3.}$$

In chamfer matching, a match is made between the target image (V) and the template image (U). Given a distance metric d, $v_i$'s corresponding pixel in U is identified as the closest pixel of $v_i$ in U given transformation $W(v_i; [R|T])$. The distance between U and V is then given by Equation 2:

$$D(U, V) = \frac{1}{|V|} \sum_{v_i \in V} \min_{u_i \in U} d'(v'_i, u_i)$$

When D is zero, the template image is perfectly matched to the target image. The optimal location of a chamfer matching is given by the parameters or rotation (R) and translation (T) obtained for the minimum D. Even with an ideal match, noise and inherent difference between the template image and the target image cause D to be greater than zero.

The computation of the distance metric d' ($v'_i$, $u_i$) may involve complex calculations and significant computational resources. In one embodiment, the distance from any pixel in the target image to the closest edge pixel is computed ahead of time, stored in memory, and reused whenever V is placed to a new location under transformation.

This results in a computation of the distance transform. Given an edge image with edge pixels U, its corresponding distance transform image $U_{DT}$ is generated by looking for the distance of each pixel from the closest edge. Once the distance transform image is determined, the distance between U and V as described in Equation 3. $U_{DT}$ is the distance measure of location $v'_i$ in the transform image $U_{DT}$. The objective of the distance measurement $d(\bullet)$ is to determine the closest pixel in the target image to a given pixel in the template. Several other distance metrics are possible.

$$D(U, V) = \frac{1}{|V|} \sum U_{DT}(v'_i) \qquad \text{Eq. 3}$$

Referring back to FIG. 2, example objects are shown with corresponding distance transforms. The distance transforms are represented with grayscale intensity to show the relative distances from pixels to the nearest obstacle pixel (e.g., a boundary pixel). In section (a) a simple square 130 is the object, and the corresponding distance transform in section (b) includes regularly shaped regions 140 around the object.

The distance transform may be drastically affected by noise. In section (c) a few random noise pixels 131 are added in the vicinity of the square 130. Because the distance transform treats the noise pixels that are separated from the rest of the object in the image as boundary pixels, the regularly shaped regions 140 are disrupted as shown by irregular regions 141 in section (d). Similarly, the distance transform may be drastically affected by missing portions or occlusion of the object, as shown by incomplete square 134 in section (e). Because the incomplete square 134 is missing boundary pixels, the distance transform follows a similar irregular shape 144 shown in section (f). Matching algorithms have difficulty matching the distance transforms in sections (d) or (e) with the original square 130 even though casual observation could easily determine that the differences were simple noise or occlusions.

The matching problem is a fundamental problem in image processing and computer vision. A robust method should be resistant to noise and be able to deal with cases where matching targets are incomplete. The ordinary chamfer matching is very sensitive to noise and the result of matching will become unreliable if the target object is occluded. To address these shortcomings of the ordinary chamfer matching, three improvements are described. First the use of edge orientation in the distance metric is extended. Second, an edge distance variance is used to introduce connected components into the distance metric. Third, a method for matching incomplete targets is used.

Distance Metric with Edge Orientation

The computation of the distance transform image is very sensitive to noise in that even a few pixels can significantly change the contents of the chamfer distance field, as shown in FIG. 2. To eliminate impact from noise, the inverse of the image convolved by a Gaussian as a distance transform image may be used and to some extent reduces the effect of noise.

A computing device (e.g., mobile device 122 or server 125) analyzes a target image. The target image includes at least one shape comprising edge pixels. The computing device identifies the edge pixels. The edge pixels may be at specific locations within the target image. The edge pixels may identified by comparing pixel values of adjacent pixels. The pixel values may be color, brightness, hue, intensity, or another image property. The pixel values may be a numeric value for grayscale intensity. When the difference in pixel values from one pixel to the next exceeds a threshold gap, the computing device identifies the former pixel as an edge pixel.

The computing device applies a Gaussian function to the edge pixels. The computing device may convolve the edge pixels of the target image with a Gaussian function. The Gaussian function may be a Gaussian blurring function, a normal distribution, a probability density function of a normally distributed random variable. The Gaussian function creates a gradient region around the edge pixels. The gradient region includes multiple pixels of varying pixel intensities having a gradient direction from higher pixel values to lower pixel values, or vice versa, based on the arrangement of edge pixels and the Gaussian function.

The method described provides a more accurate combined distance feature which is less sensitive to noise. Edge orientation is effective when solving matching problem using chamfer matching. The computation of edge direction does not need to generate a linear representation of the edges. Instead, the edge direction is set to be perpendicular to the gradient vector of each pixel. The edge direction of the distance transform image can be computed by taking a vector that is perpendicular to the gradient vector. However for template image V which is a binary edge image, to get an edge direction, a Gaussian is first applied to the original image to create a gradient area close to edge pixels. This enables a gradient vector to be computed based on the resulting image.

Figure 3:
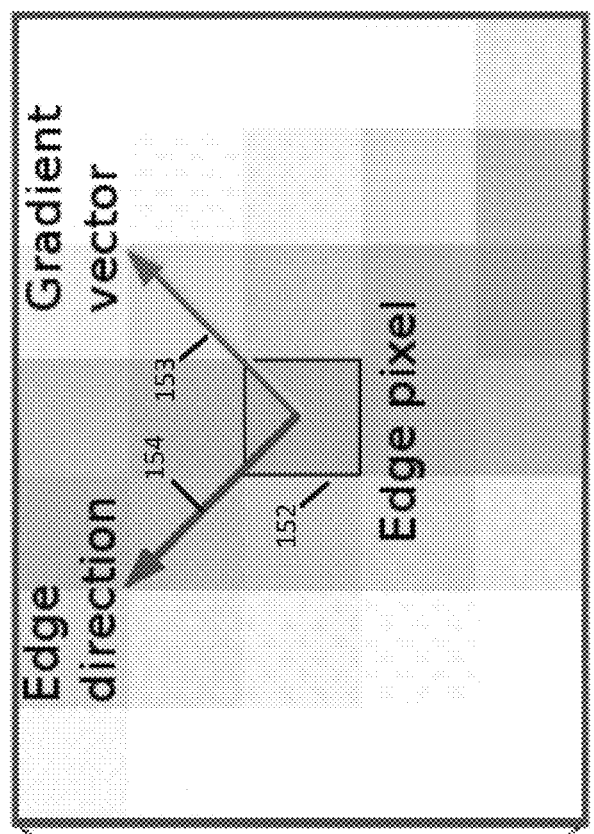
FIG. 3 illustrates an example system for template matching.
Figure 3:
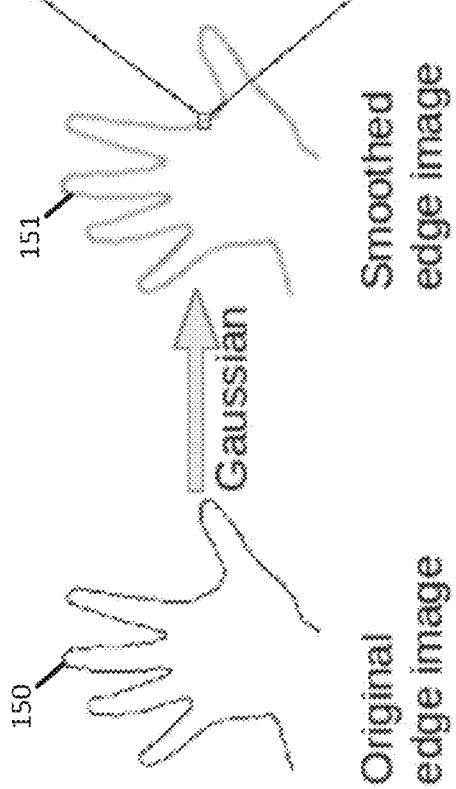

FIG. 3 illustrates an example of a distance metric with edge orientation. An original edge image 150 depicts a human hand. The computing device applies (e.g., convolution) the Gaussian function to the original edge image 150 to generate the smoothed edge image 151. The computing device may analyze the edge pixel of the edge image 150 one and a time in succession. FIG. 3 illustrates the analysis of edge pixel 152. The computing device determines a gradient direction around the edge pixel 152. The computing device may consider a predetermined window around the edge pixel. The predetermined window may be a sized square or rectangle. The predetermined may be symmetric around the edge pixel 152, which is possible with windows sized at 3 pixels by 3 pixels, 5 pixels by 5 pixels, 7 pixels by 7 pixels and so on.

The gradient vector 153 may point from the edge pixel 152 to a pixel having the lowest value, or the highest value, within the predetermined window. Note that larger predetermined windows may lead to different directions for the gradient vector 153. The edge direction vector 154 is perpendicular to the gradient vector 153.

The edge direction vector 154 may be calculated by multiplying the gradient vector 154 by an inverting vector or by multiplying one component of the gradient vector 154 by −1. There may be two possible results for the edge direction vector 154. The computing device may select one of the two possible results based on a dihedral angle. The dihedral angle measures how much the direction of the edge are correlated to each other. Depending on the direction of the edge direction vector, there are two possible angels between 0 and 180 degrees. The computing device may select the smaller of the two angles.

Figure 4:
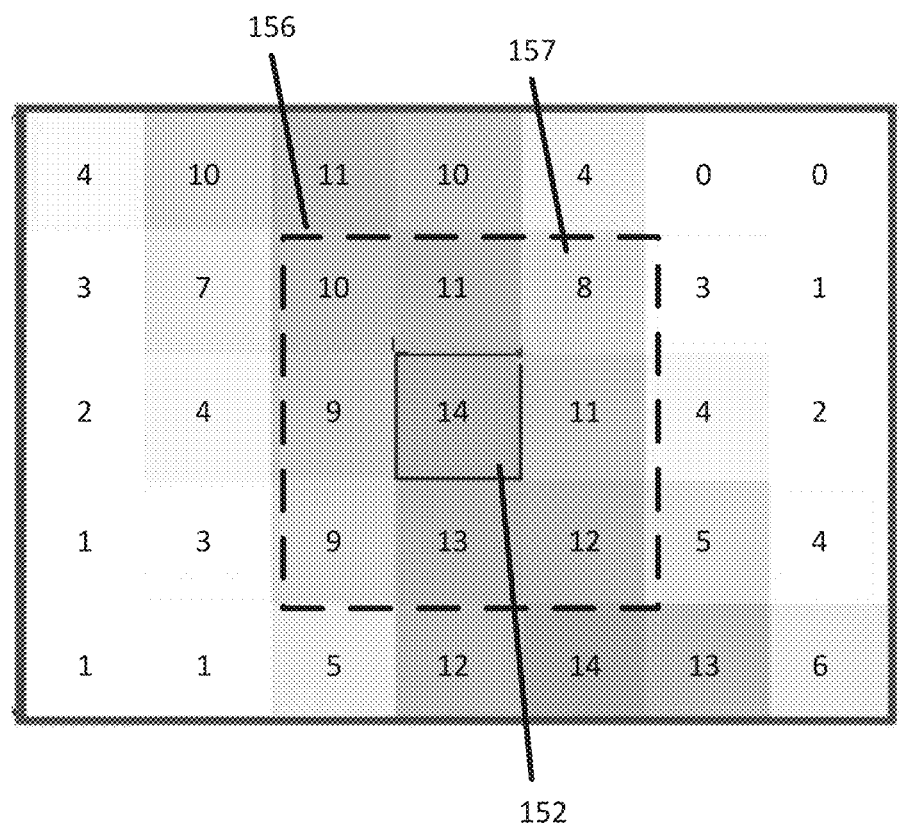
FIG. 4 illustrates an example set of pixel values for a gradient vector.
Figure 5:
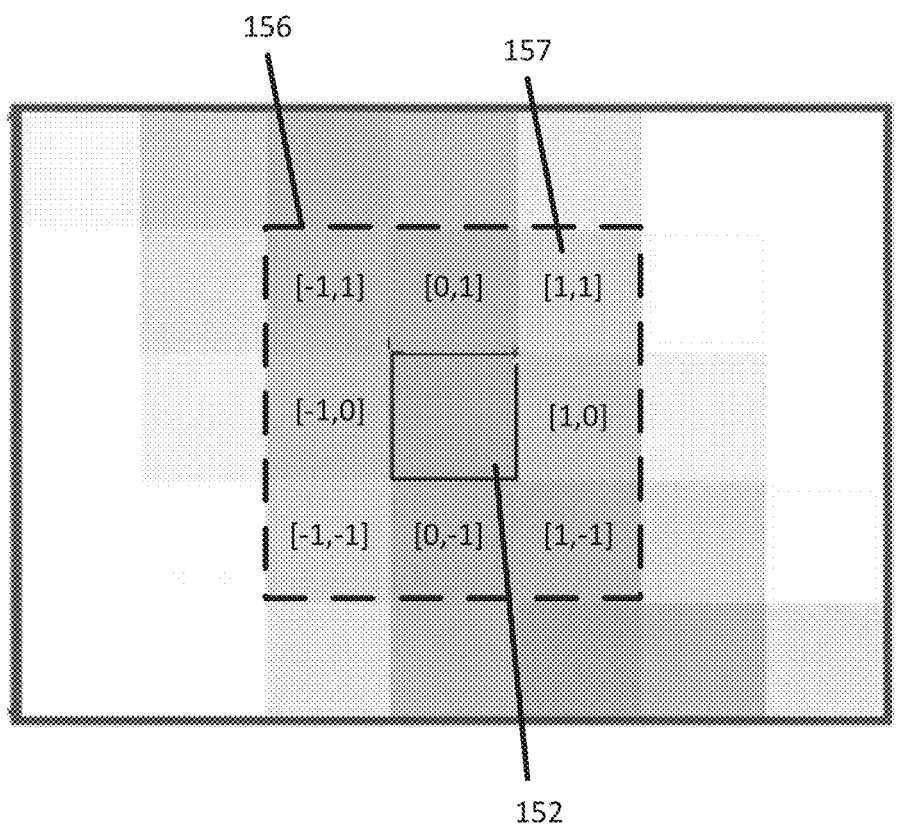
FIG. 5 illustrates example unit vectors for the gradient vector.

FIG. 4 illustrates an example set of pixel values for a gradient vector. The set of pixels may be the pixels surrounding the edge pixel 152 of FIG. 3 as defined by window 156. In one example, the pixel values may range from 15 for black to 0 for white. The computing device may compare the pixel values in the window 156 to identify a minimum value or a maximum value. In the example of FIG. 4, the minimum value of "8" is associated with minimum pixel 157. The computing device calculates a gradient vector from the edge pixel 152 to the minimum pixel 157. FIG. 5 illustrates example unit vectors to each of the cells in the predetermined window. The unit vector to the minimum pixel 157 is [1, 1]. The computing device may calculate the edge direction vector (edge orientation) by changing the sign of one of the components of the unit vector (e.g., [−1, 1]).

The computing device may perform Equation 4 to calculate a distance function from a pixel $v_i$ in the target image to the nearest corresponding pixel $u_i$ in the template image. The edge direction vectors for the target image are $\theta(v'_i)$ and nearest corresponding pixels in the template image are $\theta(u_i)$. The inner product or dot product of the respective edge direction vectors provides an indication of the relative orientations of the edge direction vectors or the similarity of the edge direction vectors. The term $\lambda$ is a constant weight, which determines the importance of edge orientations when normalizing the terms in Equation 4. The value for $\lambda$ determines a weight to pixels with as a function of the dihedral angle for the edge direction vector. Higher values for $\lambda$ or lower values for $\lambda$ may be tested by the computing device to optimize the algorithm to be sensitive to noise but prevent small noise from perturbing edges. An example value for $\lambda$ may range between 0 and 1 (e.g., 0.7). A squared Euclidean norm is used in the first term of Equations 4a and 4b. This gives a larger penalty to mismatched pixels.

$$d(v'_i, u_i) = \lambda \|v'_i - u_i\|^2 + (1-\lambda)(1 - |<\theta(v'_i), \theta(u_i)>|) \quad \text{Eq. 4a}$$

$$d(v'_i, u_i) = \lambda \|v'_i - u_i\|^2 + (1-\lambda)(1 - [\theta(v'_i) \cdot \theta(u_i)]) \quad \text{Eq. 4b}$$

In other words, the distance metric for any given edge pixel location in the target image depends on an angle between the edge direction vector of the pixel location, as determined by the gradient, and the edge direction vector of the nearest corresponding edge pixel location in the template image.

The computing device may sum the distance metric for multiple pixel locations. The multiple pixel locations may include all of the edge pixels in the target image or all pixels in the template image as identified by the computing device. The multiple pixel locations may be all pixels of the target image. The sum of the distance metric for the multiple pixel locations may be a match score that describe a degree of similarity between the target image and the template. The computing device may calculate match scores for multiple templates and select the template with the highest match score. Alternatively, the computing device may select a template based on variance of the distance metric within multiple template images.

Edge Distance Variance

A good matching result at a location in the target image is where a majority of template pixels get a small distance error. In addition, matched pixels should be linked as much as possible and have a small variance within an edge piece, so that the matched pixels better describe the shape in the target image. Therefore, the chamfer matching includes a mechanism of checking the variance of distance measures among template edge pixels.

Given a template edge pixel $v_i$ with a distance measure is computed as $d(v'_i, u_i)$ on the target image, all the pixels connected to the template edge pixel are identified and used to create a chain: $C_{vi}=\{v_{i+1}, \ldots, v_{v+m}\}$. The computing device identifies the edge pixels in the target image. For a given edge pixel, the computing device identifies adjacent pixels that are also edge pixels. The series of edge pixels for the chain.

A number n of pixels are identified among $C_{vi}$, having m pixels as a window size, which have the smallest distance measure. The value of m is defined by the number of pixels in the chain. Using these n pixels with n being smaller than or equal to m, n distances are computed and the distance variance of $v_i$ is computed. The computing device selects the n pixels with the smallest distance measure out of the m possible pixels in the window. The distance variance of the n pixels of $v_i$ may be calculated from the distance metrics of multiple pixels in the template image. The distance metric may be the sum of the square of the different between distance metrics of the multiple pixels in the template image and a median distance metric or a mean distance metric.

The parameters m and n affect the computation of the distance variance. A larger m will cause a higher variance where a lower n will cause a smaller variance. The role of the parameter n is to exclude outliers from the distance variance computation. The values of m and n used in experiments are 15 and 7 respectively. For computational efficiency reasons, each pixel maintains a list of m linked neighbors. The distance variance measure of $v_i$ is denoted as $\phi(v_i)$ and the distance measure is updated as shown by Equation 5.

$$d_\phi(v'_i, u_i) = d(v'_i, u_i) \times (1 + \phi(v_i))$$ Eq. 5

The significance of multiplying the distance variance measure in Equation 5 lies in several aspects. First, the distance measure is no longer solely dependent on each pixel's individual distance error. The distance now considers the relationship between a pixel and its best matched neighbors. Consequently, each pixel and its connected neighbors may have a small distance. Furthermore, introducing variance in Equation 5 makes it much easier to separate well matched pixels from mismatched ones, since it is more likely that pixels with large error will get a large variance as well.

Using variance a larger error change from well matched pixels as compared to high error pixels which indicates a much clearer boundary between matched and unmatched pixels. A clearer boundary is important when thresholding pixels with higher errors.

Matching Incomplete Targets

The traditional chamfer matching algorithm does not handle occlusions in the target. This is because the distance transform value changes and becomes unpredictable in parts which are occluded. Including the distance error in these occluded parts when optimizing the distance metric results in a shift from the true optimal location.

Therefore, the challenge is to separate well matched pixels from pixels in occluded areas and retain only pixels with small distance for error computation. In most cases, edge pixels within occluded areas produce a large error whereas well matched edge pixels produce a small error. Thus, a target image may be reliably matched with a template based on the occlusion free pixels while omitting the occluded pixels. By using the proposed distance measure of Equation 5, the computing device generates a much more pronounced boundary between low error and high error regions, thus making it easier to separate them.

Given $d_\phi(v'_i, u_i)$, where $v'_i = W(v_i; [R|T])$, and $I=1, \ldots, |V|$, pixels are divided according to their error. This is, in essence, a clustering problem with two clusters. Applying clustering algorithms may be too computational expensive for fast matching. Even looking for an 'elbow corner' of sorted errors will end up with time complexity of $O(n \log n)$ which is still too computational expensive for large area searching. A faster alternative is to use a histogram H whose bins $b_j \in H$ are evenly separated in $[0; \max(d_\phi)]$. Pixels can be assigned to each bin according to their error values. Given this histogram and an initial set $S=\{0\}$ in the beginning, the goal is to add to it as many low error pixels as possible. Similar to searching for an 'elbow corner' in a sorted array, a search for steep error change can be conducted on this histogram with linear time complexity. Finding an 'elbow corner' in the histogram may include too few pixels thus ailing to describe the target while generating a small error. Hence, bottom line acceptance criteria are set using the proportion of target pixels getting matched (denoted by p). An error tolerance threshold is set using Equations 4 and 5 so that when p is met any pixel in the remaining histogram whose error are smaller than $\xi$ can still be added to the set S. Once the clustering is done, the matching error is computed using all of the pixel errors collected in S. A summary of this approach is given in the following algorithm, where p represents the index of the histogram bin obtained by applying the acceptance proportion to H.

---

COMPUTEERROR(H, S, p, $\xi$)

$S = \emptyset$
for $j \leftarrow 1$ to p
  do $\{S = S \cup \{v'_i : v'_i \in h_j\}$
for $j \leftarrow$ p to sizeof(H)
  do $\begin{cases} \text{if } h_j \leq \xi \\ \text{then } S = S \cup \{v'_i : v'_i \in h_j\} \end{cases}$ $e = \frac{1}{|S|} \sum_{v'_i \in S} d_\phi(v'_i, u_i)$
return (e)

---

Figure 6:
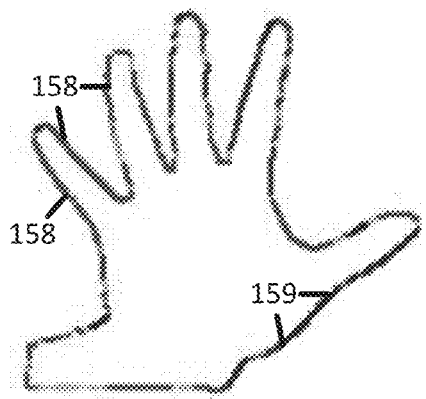
FIG. 6 illustrates an example of template matching omitting occluded pixels.
Figure 6:
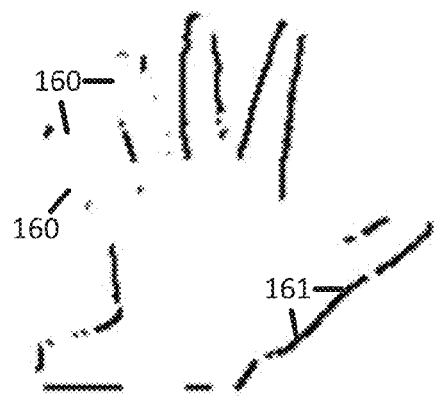
Figure 6:
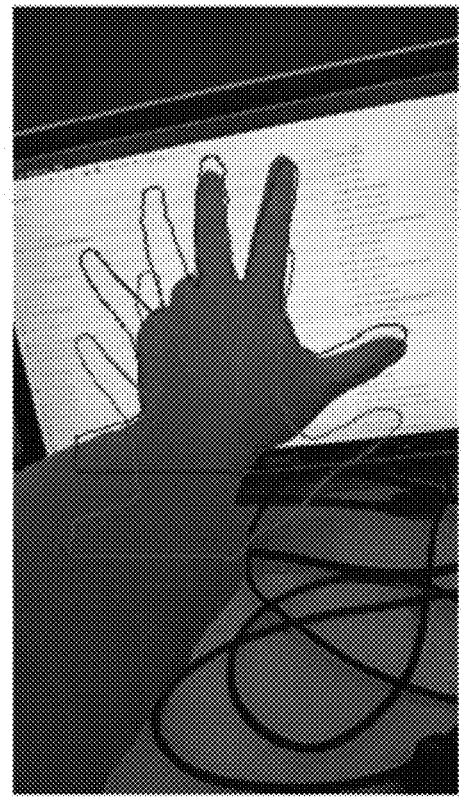
Figure 6:
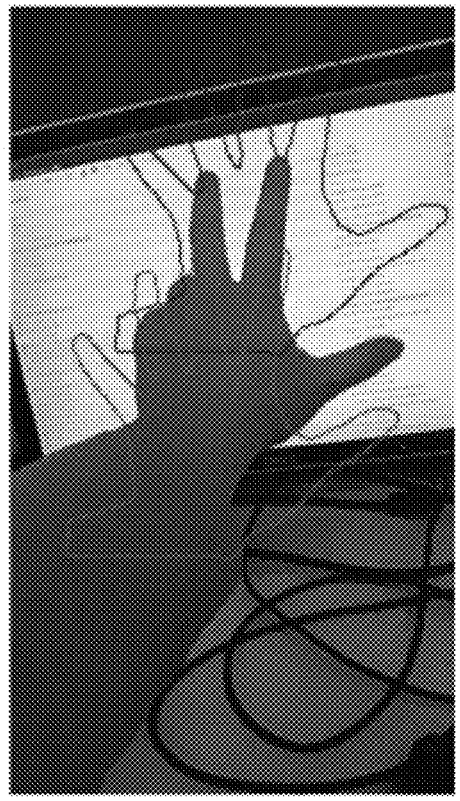

FIG. 6 illustrates an example of template matching omitting occluded pixels. Section (a) illustrates a target image including multiple edge pixels. The target image includes high error pixels 158 and low error pixels 159. Section (b) illustrates the target image after the high error pixels 158 are removed from the analysis, which is shown by missing portions 160 in the outline of the target image. The remaining portions 161 correspond to the low error pixels and are used to match the target image to the template image. Section (c) illustrates the results of matching using the error computations that omits high error pixels 158, reducing the effects of occlusions, and second (d) illustrates the results with no distinction between the variance of the distance metric. Section (c) illustrates a more accurate result than section (d).

The extended chamfer matching approach was applied to perform registration between oblique aerial images and a building footprint vector model. The footprint vector model was produced using a separate process and then simplified to create a coarse silhouette of ground truth building footprints. Two data sets were used, where each contained 1000 building footprints selected from San Francisco and Chicago urban areas. The building footprints were used as template images. The corresponding area of the target aerial images was cropped are cropped for each data set from a map base. The cropped size of buildings in aerial images was based on the template size which was increased to guarantee that the entire building was included in the cropped window. In both data sets, the resolution of the aerial images is about 0.5 meters per pixel. The images were preprocessed to remove noise. Further, small blobs were removed from the extracted edge images.

Figure 7:
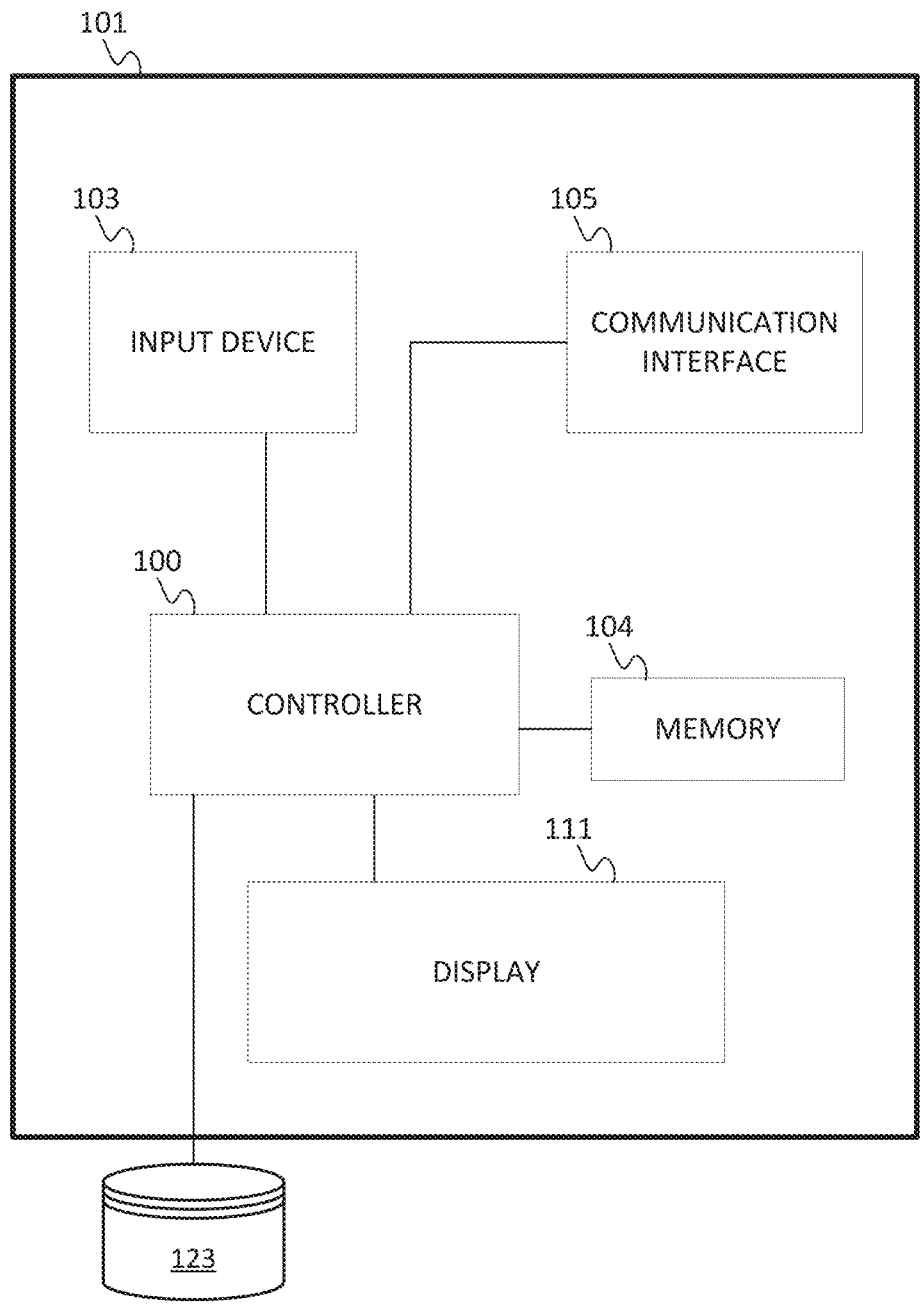
FIG. 7 illustrates an exemplary computing device of the system of FIG. 1.
Figure 8:
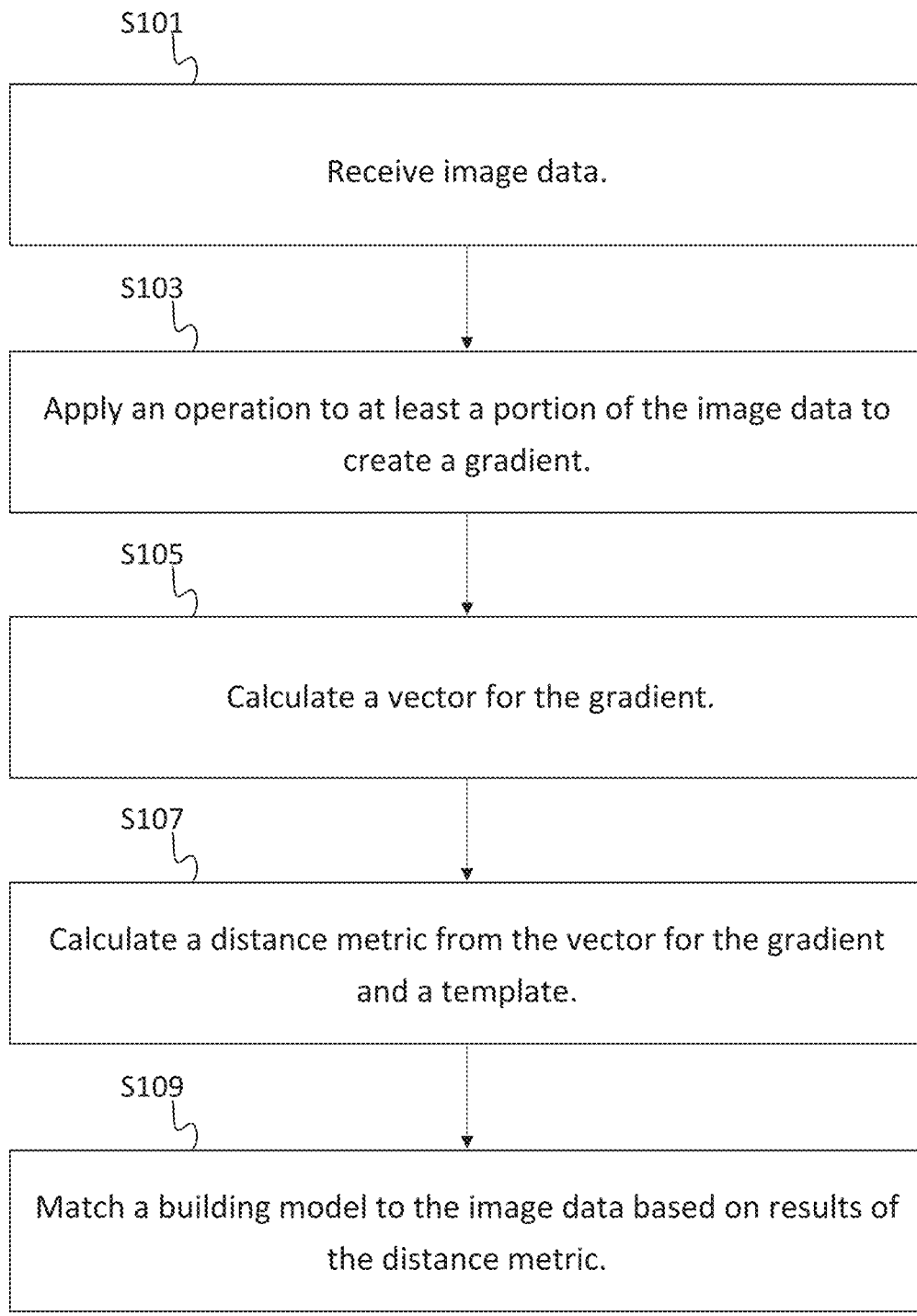
FIG. 8 illustrates an example flowchart for template matching using the computing device of FIG. 7.

Due to the nature of the data sets containing high rise buildings in a downtown area, many of the buildings are covered by shadow from nearby buildings. In the example, 53 buildings were covered by shadow in the San Francisco data set, and 74 buildings were covered by shadow in the Chicago data set. The registration algorithm is based on shifting a sliding template window within the building image. In the experiments, the following parameters are set: acceptance proportion p=50%, tolerance threshold is computed using $\xi$. Since the distance metric is a combination of a Euclidean distance and an angular distance, hence, tolerance threshold is computed as a combination of a Euclidean distance threshold $t_e=5$ pixels and an angular distance threshold $t_a=15$ degrees. Different settings of $\lambda$ were tested. To evaluate the results, the ground truth matching locations were manually labeled. The accuracy of the result is measured by computing the proportion of area between the algorithm's resulting location and the known ground truth location. Two kinds of accuracy measurement are used in the results. In the first measurement, the average coverage accuracy of the proposed algorithm is computed. In the second measurement, the number of buildings in the test set that are above given coverage accuracy is computed. In both measurements, the weight constant $\lambda$ is varied between 0 and 1. The result of the algorithm is compared with that of other chamfer matching techniques and provides a higher matching accuracy for both data sets. To further evaluate the performance of the proposed algorithm for matching incomplete target buildings in San Francisco and 74 buildings in Chicago. The best results of running this test are presented in Table 1. As can be observed, on average, the proposed algorithm produces 80% accuracy on both data sets compared with about 30-50% accuracy when using other chamfer matching techniques FIG. 7 illustrates an exemplary computing device 101. The computing device 101 may be the server 125 or the mobile device 122 of the system of FIG. 1. The computing device includes a controller 100, a memory 104, an input device 103, a communication interface 105, and a display 111. Additional, different, or fewer components may be included in the computing device 101. FIG. 8 illustrates an example flowchart for template matching using the computing device of FIG. 7. One or more acts may be added, removed, or substituted in the flowchart. Acts may be repeated.

At act S101, the computing device 101 may receive image data including one or more objects. The image data may be a photograph such as an aerial photograph including buildings. The image data may include objects as vehicles, roadways, road signs, lane markers, pedestrians, or road indicia. The image data may include images in other fields such as hand signals used in sign language, animals, or types of trees. The image data may include pixels having at least one pixel value. The pixel value may be a numerical range (e.g., 0 to 255) that describe the intensity, color, or brightness of the pixel.

At act S103, the computing device 101 applies an operation to at least a portion of the image data to create a gradient. The portion of the image may include edge pixels. The computing device 101 may identify changes in contrast within the image data as the location of edge pixels. The computing device 101 detects images by applying a highpass filter to the image data. The computing device 101 may convolve the image data with a kernel in the spatial domain. The kernel may be a set of values applied in a neighborhood of the object pixel in the image data. The kernel may tend to blur the edge pixels of objects in the target image, resulting in a gradient. In another embodiment, the computing device 101 may apply the operation to all of the image data.

At act S105, the computing device 101 calculates a vector for the gradient. The vector for the gradient may referent to a direction of the gradient or a direction perpendicular to the gradient. The vector for the gradient may be perpendicular to a direction with a largest magnitude difference in the gradient extending from the object pixel in the direction of the gradient. The direction of the gradient may be defined as the lowest pixel value or highest pixel value in a gradient window surrounding the object pixel. The gradient window may be a square window having a length including an odd number of pixels greater than one (e.g., a 3×3 window gradient, a 5×5 window gradient or a 9×9 window gradient).

At act S107, the computing device 101 calculates a distance metric from the vector for the gradient and a template. The distance metric may be based on edge direction vectors of the target image defined as being orthogonal to the direction of the gradient and similar edge direction vectors of a template image. The distance metric may be a function of an angle between the edge direction vectors of the target image and the edge direction vectors of the template image.

At act S109, the computing device 101 matches a building model to the image data based on results of the distance metric. The computing device 101 may calculate a variance of error values from the distance metric. First, the computing device 101 identifies a chain of pixels extending from or including the object pixels. The distance metric for each of the pixels in the chain of pixels are analyzed statistically.

In one example, error values for the distance metric for the chain of pixels are placed in an ordered list. An elbow, cliff, or other abrupt change along the error values is identified by calculating differences between sequential pairs of the ordered list and comparing the differences between sequential pairs to a threshold value. The error values before the abrupt change are considered low error values and the error values after the abrupt change are considered high error values. The computing device 101 may identify a portion of the chain of pixels in the ordered list before the threshold value is reached as accurate distance metric values, and accordingly, match the building model based on the to the image data as a function of the portion of the chain of pixels.

The computing device 101 may compare multiple templates to the image data. In one example, the computing device 101 generates templates scores by summing distance metrics for a plurality of edge pixels in multiple templates. The computing device 101 may select the highest template score for the template that matches the image data.

The input device 103 may be one or more buttons, keypad, keyboard, mouse, stylist pen, trackball, rocker switch, touch pad, voice recognition circuit, or other device or component for inputting data to the mobile device 122. The input device 103 and the display 111 may be combined as a touch screen, which may be capacitive or resistive. The display 111 may be a liquid crystal display (LCD) panel, light emitting diode (LED) screen, thin film transistor screen, or another type of display. The input device 103 may be configured to receive a user input to define a window size for the image processing, a neighborhood size for the distance metric, or another parameter. The mobile device 122 may also include range finding device, range finding circuitry, position circuitry and/or a camera.

The positioning circuitry is optional and may be excluded for the map-related functions. The positioning circuitry may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122. The accelerometer is operable to detect, recognize, or measure the rate of change of translational and/or rotational movement of the mobile device 122. The mobile device 122 receives location data from the positioning system. The location data indicates the location of the mobile device 122. The building map and/or the image data may be accessed based on the location data from the positioning system.

The database 123 of the system 120 may be a geographic database. The geographic database 123 includes information about one or more geographic regions. Each road in the geographic region is composed of one or more road segments. A road segment represents a portion of the road.

The navigation-related features may include a route calculation application. End users may access a route from an origin to a destination. The route calculation application determines the route for the end user to travel along the road segments to reach the desired destination. In order to calculate a route, the route calculation application is provided with data identifying a starting location (origin) and a desired destination location. In one embodiment, the starting location may be the end user's current position and the destination may be entered by the end user. Given at least the identification of the starting location (origin) and the desired destination location, the route calculation application determines one or more solution routes between the starting location and the destination location. A solution route is formed of a series of connected road segments over which the end user can travel from the starting location to the destination location. When the route calculation application calculates a route, the application accesses the geographic database 123 and obtains data that represent road segments around and between the starting location and the destination location. The road calculation application uses the data to determine at least one valid solution route from the starting location to the destination location.

The map-related features may be any of the navigation-related features provided to the user without reference to the current location of the user or the device. In addition, map-related features may include display and manipulation of a map of a geographic region. The map-related features may be provided without navigation-related features.

The controller 100 may include a general processor, digital signal processor, an application specific integrated circuit (ASIC), field programmable gate array (FPGA), analog circuit, digital circuit, combinations thereof, or other now known or later developed processor. The controller 100 may be a single device or combinations of devices, such as associated with a network, distributed processing, or cloud computing.

The memory 104 may be a volatile memory or a non-volatile memory. The memory 104 may include one or more of a read only memory (ROM), random access memory (RAM), a flash memory, an electronic erasable program read only memory (EEPROM), or other type of memory. The memory 104 may be removable from the mobile device 100, such as a secure digital (SD) memory card.

The communication interface 105 may include any operable connection. An operable connection may be one in which signals, physical communications, and/or logical communications may be sent and/or received. An operable connection may include a physical interface, an electrical interface, and/or a data interface. The communication interface 105 provides for wireless and/or wired communications in any now known or later developed format.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

Non-transitory computer readable media may be encoded with instructions for performing any of the above acts or functions. While the non-transitory computer-readable medium may be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

We claim:

1. A method comprising:
   receiving image data;
   performing an edge detection algorithm on the image data, wherein the edge detection algorithm includes a distance metric based on angles between gradient vectors in the image data and gradient vectors in one or more templates;
   identify a plurality of pixels from the distance metric;
   calculate error values from the distance metric for the plurality of pixels; and
   matching a building model to the image data based on results of the edge detection algorithm and the error values from the distance metric, wherein the building model is associated with the one or more templates.

2. The method of claim 1, wherein the image data is aerial data.

3. The method of claim 1, wherein the distance metric is a function of variance.

4. The method of claim 1, further comprising:
   applying a gaussian algorithm to the image data;
   analyzing a gradient area around each of a plurality of pixels;
   calculating the gradient vector from the gradient area for each pixel; and
   comparing the gradient vectors.

5. The method of claim 4, wherein the distance metric is based on a gradient vector with a largest magnitude.

6. An apparatus comprising:
   at least one processor; and
   at least one memory including computer program code for one or more programs; the at least one memory and the computer program code configured to, with the at least one processor, cause the apparatus to at least perform:
   receive image data;
   apply an operation to at least a portion of the image data to create a gradient;
   calculate a vector for the gradient;
   calculate a distance metric from the vector for the gradient and a template;
   identify a chain of pixels from the distance metric;
   calculate a variance of error values from the distance metric for the chain of pixels; and
   match a building model to the image data based on a result of the distance metric and the variance of error values.

7. The apparatus of claim 6, wherein the vector for the gradient is perpendicular to a direction with a largest magnitude difference in the gradient.

8. The apparatus of claim 6, wherein the gradient is a square with a predetermined number of pixels.

9. The apparatus of claim 6, wherein the at least one memory and the computer program code are configured to, with the at least one processor, cause the apparatus to at least perform:
   determine an ordered list of the error values from the distance metric for the chain of pixels;
   calculate differences between sequential pairs of the ordered list; and
   compare the differences between sequential pairs to a threshold value.

10. The apparatus of claim 9, wherein the at least one memory and the computer program code are configured to, with the at least one processor, cause the apparatus to at least perform:
    identify a portion of the chain of pixels in the ordered list before the threshold value is reached, wherein the building model is matched to the image data as a function of the portion of the chain of pixels.

11. The apparatus of claim 6, wherein the portion of the image data includes an edge pixel, and the distance metric for the edge pixel depends on an angle between the vector for the gradient of the pixel and an edge direction vector of a corresponding edge pixel location in the template.

12. The apparatus of claim 6, wherein the distance metric (d) is defined according to $$d = \lambda \|v_i - u_i\|^2 + (1-\lambda)(1 - [\theta(v_i) \cdot \theta(u_i)]),$$

wherein $\lambda$ is a constant weighting factor, $v_i$ is a pixel in a target image, $u_i$ is a corresponding pixel in the template, an edge direction vector for the target is $\theta(v_i)$, and an edge direction vector for the template is $\theta(u_i)$.

13. The apparatus of claim 6, wherein the image data is an aerial photograph of one or more buildings.

14. The apparatus of claim 6, wherein the operation is a convolution with a Gaussian function.

15. The apparatus of claim 6, wherein the at least one memory and the computer program code are configured to, with the at least one processor, cause the apparatus to at least perform:
    generate template scores by summing distance metrics for a plurality of edge pixels in multiple templates; and
    selecting a highest template score, wherein the highest template score is associated with the match building model.

16. A method comprising:
    receiving aerial image data including one or more buildings;
    identifying chains of edge pixels in the aerial image data, wherein the chains of edge pixels partially form outlines of the one or more buildings;
    applying an operation to at least a portion of the image data to create a gradient;
    calculating a vector for the gradient;
    calculating a distance metric from the vector for the gradient and a template;
    calculating a variance of error values from the distance metric for the chains of pixels; and
    matching a building model to the outlines of the one or more buildings based on a result of the distance metric and the variance of error values.

17. The method of claim 16, wherein the operation is a convolution with a Gaussian function.

18. The method of claim 16, wherein the distance metric depends on an angle between the vector for the gradient of the pixel and an edge direction vector of a corresponding edge pixel location in the template.

19. The method of claim 1, further comprising:
    determining an ordered list of the error values from the distance metric for the plurality of pixels;
    calculating differences between sequential pairs of the ordered list; and
    comparing the differences between sequential pairs to a threshold value.

20. An apparatus comprising:
    at least one processor; and
    at least one memory including computer program code for one or more programs; the at least one memory and the computer program code configured to, with the at least one processor, cause the apparatus to at least perform:
    receive image data;
    apply an operation to at least a portion of the image data to create a gradient;
    calculate a vector for the gradient;

calculate a distance metric from the vector for the gradient and a template;
identify a chain of pixels from the distance metric;
determine an ordered list of error values from the distance metric for the chain of pixels;
calculate differences between sequential pairs of the ordered list;
perform a comparison of the differences between sequential pairs to a threshold value; and
match a building model to the image data based on a result of the distance metric and the comparison of the differences between sequential pairs to the threshold value.

* * * * *